US011304209B2

(12) United States Patent
Nammi et al.

(10) Patent No.: US 11,304,209 B2
(45) Date of Patent: *Apr. 12, 2022

(54) COMPUTING CHANNEL STATE INFORMATION IN A 5G WIRELESS COMMUNICATION SYSTEM IN 4G SPECTRUM FREQUENCIES

(71) Applicant: AT&T Intellectual Property I, L.P., Atlanta, GA (US)

(72) Inventors: SaiRamesh Nammi, Austin, TX (US); Thomas Novlan, Cedar Park, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,922

(22) Filed: Oct. 1, 2020

(65) Prior Publication Data
US 2021/0022150 A1 Jan. 21, 2021

Related U.S. Application Data

(63) Continuation of application No. 16/271,135, filed on Feb. 8, 2019, now Pat. No. 10,873,953.

(51) Int. Cl.
*H04W 72/08* (2009.01)
*H04W 72/10* (2009.01)

(52) U.S. Cl.
CPC ......... *H04W 72/085* (2013.01); *H04W 72/10* (2013.01)

(58) Field of Classification Search
CPC ....... H04L 5/005; H04L 5/0053; H04L 5/003; H04L 5/0048; H04L 5/0092;
(Continued)

(56) References Cited

U.S. PATENT DOCUMENTS

2011/0243094 A1\* 10/2011 Dayal ............... H04W 72/1215
370/331
2013/0003671 A1\* 1/2013 Wang ..................... H04B 1/18
370/329
(Continued)

OTHER PUBLICATIONS

ETSI, "5G; NR; Physical layer procedures for data (3GPP TS 38.214 version 15.2.0 Release 15)," © ETSI, 2018, 95 pages.
(Continued)

*Primary Examiner* — Jung Liu
(74) *Attorney, Agent, or Firm* — Amin, Turocy & Watson, LLP

(57) ABSTRACT

Systems and methods for computing channel state information in a 5G wireless communication system in 4G spectrum frequencies is described herein. A method as described herein includes determining, by network equipment comprising a processor, that a cell in which the network equipment operates is configured for coexistence between new radio signals and long term evolution signals based on a starting symbol location for non-user equipment specific control signaling received from the cell relative to a frame boundary; predicting, by the network equipment in response to the determining that the cell is configured for the coexistence, long term evolution resource overhead data associated with the long term evolution signals; and determining, by the network equipment, channel state information reference resources at least in part by removing the long term evolution resource overhead data from channel state information computation data.

20 Claims, 11 Drawing Sheets

(58) Field of Classification Search
CPC ......... H04L 5/0098; H04L 5/001; H04L 1/00; H04L 27/2613; H04L 27/2692; H04L 5/0091; H04L 27/2602; H04W 72/042; H04W 72/005; H04W 72/14; H04W 72/12; H04W 16/14
See application file for complete search history.

(56) References Cited

U.S. PATENT DOCUMENTS

| | | | |
|---|---|---|---|
| 2014/0112300 A1* | 4/2014 | Han | H04N 21/25825 |
| | | | 370/329 |
| 2018/0083743 A1* | 3/2018 | Chen | H04L 1/1854 |
| 2019/0037579 A1* | 1/2019 | Yi | H04W 16/14 |
| 2019/0089498 A1* | 3/2019 | Pelletier | H04L 5/003 |
| 2019/0109672 A1* | 4/2019 | Kim | H04L 5/001 |
| 2019/0141696 A1* | 5/2019 | Kim | H04L 5/1469 |
| 2019/0357264 A1* | 11/2019 | Yi | H04L 5/001 |

OTHER PUBLICATIONS

Office Action dated Mar. 20, 2020 for U.S. Appl. No. 16/271,135, 30 pages.

* cited by examiner

COMPUTING CHANNEL STATE INFORMATION IN A 5G WIRELESS COMMUNICATION SYSTEM IN 4G SPECTRUM FREQUENCIES

RELATED APPLICATION

The subject patent application is a continuation of, and claims priority to, U.S. patent application Ser. No. 16/271,135 (now U.S. Pat. No. 10,873,953), filed Feb. 8, 2019, and entitled "COMPUTING CHANNEL STATE INFORMATION IN A 5G WIRELESS COMMUNICATION SYSTEM IN 4G SPECTRUM FREQUENCIES," the entirety of which application is hereby incorporated by reference herein.

TECHNICAL FIELD

The subject application is related to wireless communication systems, and, for example, to reducing the interference in multiple antenna wireless communication systems by providing more accurate channel state information.

BACKGROUND

For New Radio (NR, often referred to as 5G) wireless communication systems, the 3GPP (3rd Generation Partnership Project) defines millimeter wave frequencies. However, operation in the high frequency spectrum can be disadvantageous, because coverage is limited with high frequencies. However, much of the lower frequency spectrum is already being used by 4G LTE (Long Term Evolution).

Because both LTE and 5G NR uses OFDM (orthogonal frequency division multiplexing) as the waveform, one option to increase the coverage of 5G systems is to use the same frequency band for both LTE and 5G NR, which is referred to as LTE-NR coexistence (LNC). A first approach to LTE-NR coexistence in the same frequency band is to share the spectrum, which can be done statically or dynamically.

In a static sharing scheme, part of the LTE spectrum is migrated to NR. The advantage of this approach is this method is easy to implement, as a new dedicated spectrum is allocated for NR and a separate, standalone NR scheduler can be used. However a disadvantage to this approach is that static sharing reduces the spectrum available for both LTE and NR.

In a dynamic sharing scheme, the full bandwidth is used for LTE and NR, with the spectrum for each being dynamically adapted based on traffic conditions. As a result, the peak data rate is not impacted and the overall spectrum is efficiently used. Note that scheduling coordination or a single scheduler needs to be used for LTE-NR coexistence to correctly operate in a dynamic sharing scheme.

With dynamic LTE and NR coexistence, the number of available resources for NR thus depends on the scheduling of LTE user equipments; that is, the number of resource elements changes based on whether the network uses the resources for LTE cell-specific reference signal (CRS) transmission or not. Because of the adaptive number of resource elements, a user equipment has to compute the channel state information (CSI) and report this information to the network. However because the user equipment does not know the allocated LTE resources and the scheduled number of resource blocks in advance, the CSI computed by the user equipment is not accurate when dynamic LTE-NR coexistence is in use.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
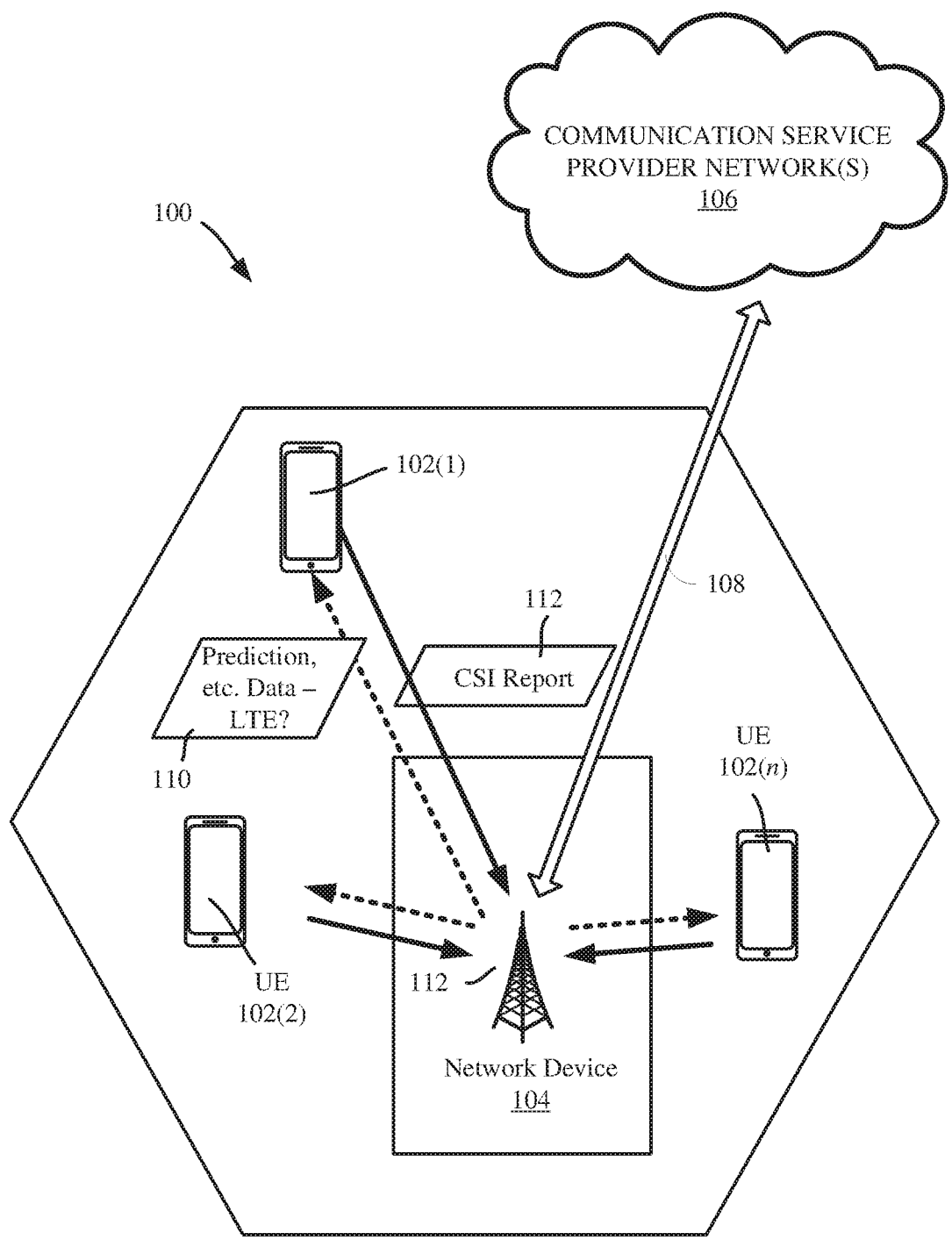
FIG. 1 illustrates an example wireless communication system in which a network node device (e.g., network node) and user equipment (UE) can implement various aspects and implementations of the subject disclosure.

One or more aspects of the technology described herein are generally directed towards obtaining information at a user equipment as to whether multiple access technologies (e.g., new radio (NR) and long term evolution (LTE)) are multiplexed on the same carrier or not. The information may be obtained in various ways, such as autonomously or with network assistance.

In general as described herein, a user equipment, which is communicating in new radio communications with a network device, adapts the channel state information (CSI) reference resource (comprising rank indicator, precoder matrix indicator, and channel quality indicator) for reporting to the network based on whether the information indicates that LTE communications are also taking place. If only new radio communications are in use, new radio CSI computations are made, e.g., in a conventional manner by removing the NR overhead from the CSI computation data. If both new radio communications LTE communications are in use, e.g., LTE-NR coexistence is indicated, then the CSI computations are made based on removing the NR overhead and the predicted overhead of the LTE reference signals and control channel from the CSI computation data.

As will be understood, various techniques at the UE are used to determine whether LTE-NR coexistence is occurring in a cell. For example, if the network provides rate matching patterns to a user equipment that indicate LTE communications are occurring (in addition to new radio communications), the user equipment can assume the structure of LTE reference signals and overhead in computing the CSI.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, the system 100 can comprise one or more user equipment (UEs) 102(1)-102(n), which can have one or more antenna panels having vertical and horizontal elements. A user equipment such as the UE 102(1) can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of a user equipment such as the UE 102(1) can be target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. A user equipment can also comprise IoT ("internet of things") devices that communicate wirelessly. In various embodiments, system 100 is or comprises a wireless communication network serviced by one or more wireless communication network providers. In example embodiments such as in FIG. 1, a UE can be communicatively coupled via a network node device 104 a wireless communication network (e.g., communication service provider network(s) 106).

The non-limiting term network node (or radio network node) is used herein to refer to any type of network node such as the network device 104 and/or connected to other network node, network element, or another network node from which the a user equipment such as the UE 102(1) can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network device 104) can comprise but are not limited to: NodeB devices, base station (BS) devices, access point (AP) devices, and radio access network (RAN) devices. The network device 104 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UEs 102(1)-102(n) and the network device 104). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102(1)-102(n) and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In FIG. 1, as described herein, a user equipment (e.g., 102(1)) is configured to receive prediction data such as reference signals and other data 110, and use those to estimate the precoder matrix indicator and rank indication (PMI and RI) via a PMI and RI estimation process, and used to determine a channel quality indicator (CQI) as described herein. A codebook may be searched for some of the information (note that PMI can be defined as an index within the codebook, or the PMI can be defined as a precoder itself, depending on the context). Once the PMI and RI are estimated, these data are returned as part of a channel state information (CSI) report 112 to the network device 104. Described herein is how the user equipment estimates a suitable CSI, e.g., CQI/PMI/RI, based on whether the network device is operating with only in NR/5G communications, or is operating with LTE-NR coexistence communications.

Figure 2:
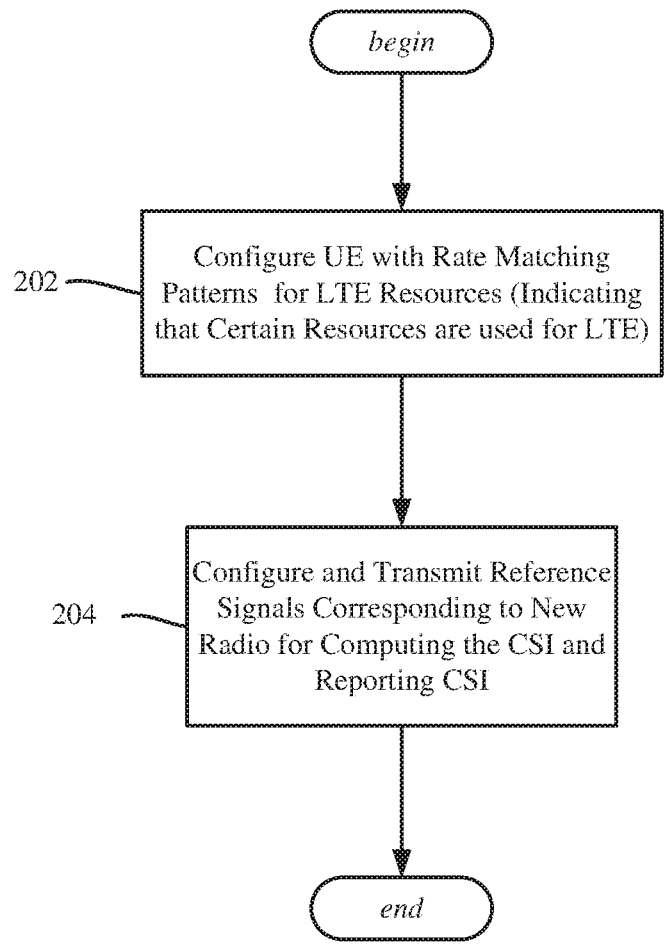
FIG. 2 is a flow diagram representing example operations that a network device can take to configure a user equipment, including in a way that indicates that resources are being used for LTE communications, in accordance with various aspects and implementations of the subject disclosure.

A first aspect is for a user equipment, which is operating with new radio communications in a cell, to determine (e.g., predict) whether LTE communications are also occurring in the cell. Various ways to obtain relevant LTE-related information are described herein. By way of example, in FIG. 2, consider that at operation 202, the network device configures the user equipment with rate matching patterns for LTE resources, thereby indicating that certain resources are used for LTE. As represented by operation 204, the network device further configures and transmits reference signals corresponding to NR for computing the CSI and reporting the CSI. In this example, the user equipment can determine, based on the indication that certain resources are being used for LTE, that the network device is operating with LTE-NR coexistence.

Figure 3:
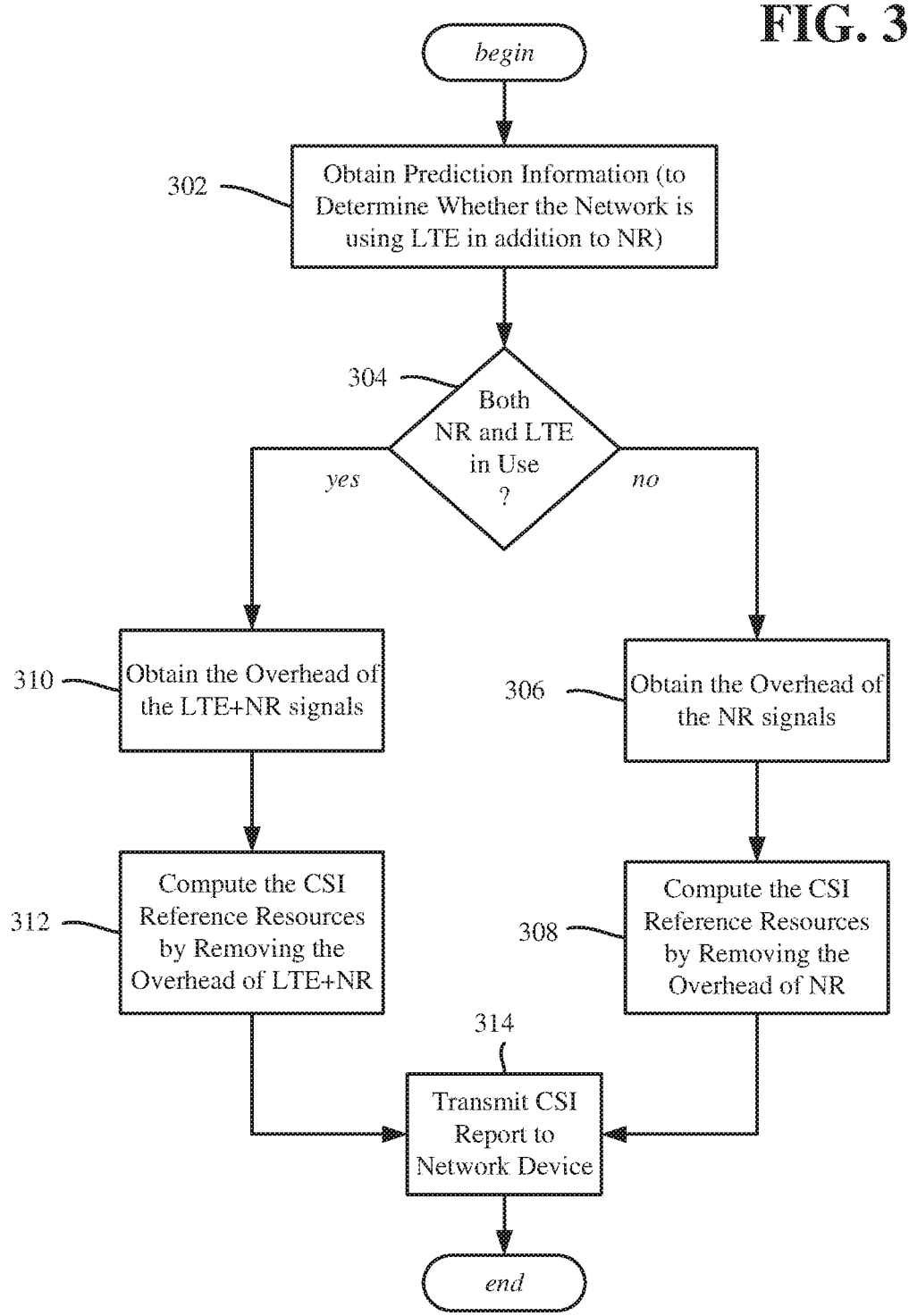
FIG. 3 is a flow diagram representing example operations that a user equipment can perform to determine how to compute a channel state information for reporting to a network device, in accordance with various aspects and implementations of the subject disclosure

FIG. 3 is a flow diagram representing operations of a user equipment that is to transmit a CSI report to a network device. At operation 302, the user equipment obtains the prediction information (or other information) that is used to determine to determine whether the network is using LTE in addition to NR communications. If, as evaluated at operation 304 the user equipment determines that LTE communications are not present, then conventional CSI computations can be used; operation 306 obtains the overhead of the NR signals, (note that the user equipment can automatically obtain information about the NR overhead from the configured parameters). Operation 308 then computes the CSI reference resources by removing the overhead of the NR signals, and operation 314 transmits a corresponding CSI report to the network device.

If instead, as evaluated at operation 304 the user equipment determines that LTE communications are present, then operation 310 of the user equipment predicts the overhead due to the LTE signals in the OFDM time-frequency grid, and uses only the remaining resources for computing the CSI. For example, if the first two OFDM symbols are used for PDCCH transmission for LTE and the network uses four CRS (cell specific reference signals) for LTE reference signals transmission, then the UE removes these resources when computing the CSI reference resources at operation 312. Note that operations 310 and 312 also remove the overhead due to NR. Operation 314 thereafter transmits a corresponding CSI report to the network device.

Thus, the user equipment needs to obtain information regarding whether LTE-NR coexistence is in use, and if so, obtain information about the LTE overhead to remove. The following summarizes various schemes related to these aspects; note that the network can provide explicit information instead of or in addition to the following schemes.

One type of scheme is based on network assistance. For example, as described in the example of FIG. 2, the network can configure the UE with rate matching patterns for avoiding interference between the LTE and NR for the traffic channel. Further, the control region configuration for system information, RACH, paging and other non-UE specific signaling provided in broadcast channel messages (e.g. MIB and SIB) can indicate whether LTE transmissions may be present on the carrier, for example based on the PDCCH and DMRS starting symbol location. In this way, an NR user equipment can obtain information about LTE signals and associated overhead.

In another type of scheme, a user equipment makes an autonomous decision. More particularly, the user equipment derives the LTE overhead based on the configured LTE parameters. For example the user equipment can obtain information about the LTE control channel overhead based on the PCFICH signals and reference signals.

Figure 4:
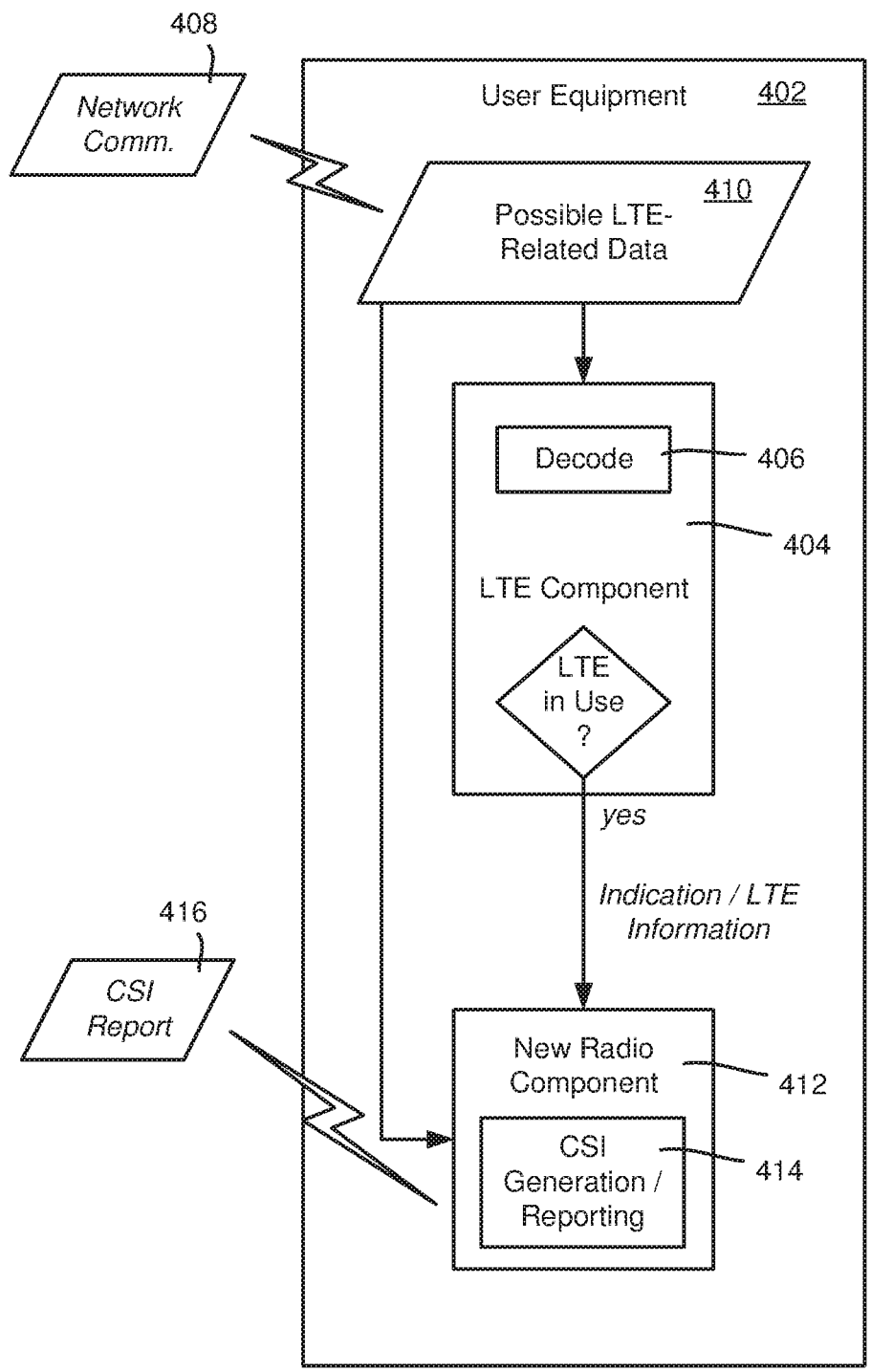
FIG. 4 is a block diagram representing example components of a user equipment with respect to computing more accurate channel state information for reporting to a network device, in accordance with various aspects and implementations of the subject disclosure

By way of example, as depicted in FIG. 4, consider that an LTE component 404 of a user equipment 402 attempts to decode (block 406) a network communication 408 that may contain LTE-related data 410. Based on the data 410, if the LTE component 404 decides that LTE is in use, the LTE component 404 can provide an indication to a new radio component 412 of the user equipment 402. Any information regarding or otherwise related to the LTE overhead can be provided to the new radio component 412. The new radio component 412, for example, includes the logic of FIG. 3 that decides whether LTE overhead also needs to be removed, and can thus generate and report the CSI (block 414) and send the CSI report 416 to the network device based on any indication from the LTE component. Note that it is feasible for the new radio component 412 to request such information from the LTE component and thereby initiate a response.

In another alternative type of scheme, a user equipment makes a per-band/carrier determination. For example, the user equipment may make the determination depending on which band(s) the user equipment is operating and monitoring NR control and data signals. As a more particular example, certain bands identified by their Absolute Radio Frequency Channel Number (ARFCN) are defined to support LTE-NR coexistence. Alternatively, the detected subcarrier spacing (SCS) of the synchronization signal block (SSB), 15 kHz versus 30 kHz, and time-domain mapping pattern (e.g. symbol offset relative to a frame boundary) may indicate whether or not LTE-NR is deployed on a given band/carrier.

Turning to aspects related to the CSI report, the following table, TABLE 1, represents an example CSI report:

| PMI-FormatIndicator = widebandPMI and CQI-FormatIndicator = widebandCQI | PMI-FormatIndicator = subbandPMI or CQI-FormatIndicator = subbandCQI | | |
|---|---|---|---|
| | | CSI Part II | |
| | CSI Part I | wideband | subband |
| CRI | CRI | Wideband CQI for the second TB | Subband differential CQI for the second TB of all even subbands |
| Rank Indicator | Rank Indicator | PMI wideband (X1I and X2) | PMI subband information fields $\chi_2$ of all even subbands |
| Layer Indicator | Layer Indicator | — | Subband differential CQI for the second TB of all odd subbands |
| PMI wideband (X1 and X2) | Wideband CQI | — | PMI subband information fields $\chi_2$ of all odd subbands |
| Wideband CQI | Subband differential CQI for the first TB | — | — |

Once the UE estimates the reference resources for obtaining the CSI, the UE uses any suitable technique choose the CSI. Note that as an example two techniques for obtaining CSI, namely using mutual information or using a capacity approach are described herein; in general it is up to the UE as to which technique to choose.

As described herein, in NR, the user equipment needs to estimate a suitable CSI, including CQI/PMI/RI, in order to maximize the throughput while simultaneously maintaining the block-error-rate (BLER) constraint, which can be mathematically described by a joint (integer) optimization problem, $$\max_{CQI, PMI, RI} \text{Throughput}(CQI, PMI, RI) \quad (1)$$

$$\text{subject to } BLER \leq \text{Threshold}$$

This joint (discrete/integer) optimization problem does not have any closed-form solution. Hence, one technique tries to estimate a suitable PMI/RI (independent of CQI); thereafter, a suitable CQI is estimated accordingly for the chosen PMI (and RI).

By way of example, consider a single-cell scenario having perfect time and synchronization, a received system model for (closed-loop) SM per sub-carrier (post-FFT) can be shown as, $$Y = HWX + N \quad (2)$$

where, $Y \in X^{N_r \times 1}$ corresponds to a received signal vector, and $H \in X^{N_r \times N_t}$ describes an overall channel matrix. A complex zero-mean Gaussian noise vector $n \in C^{N_r \times 1}$ has covariance $R_n$. An unknown complex data/symbol vector is denoted by $x \in A^{N_L \times 1}$ (having normalized power $E\{xx^H\} = R_x = I$) corresponding to M-QAM (e.g., 64-QAM) constellation A. A (complex) precoder $W_{PMI} \in \Pi^{N_t \times N_L}$ is selected from a given/known codebook $\Pi$ having $N_\Pi$ number of precoders (where, $PMI = \{0, 1, \ldots N_\Pi - 1\}$) for a given rank$\leq \min\{N_r, N_t\}$.

The post-processing SINR per $i^{th}$ spatial layer for a given PMI, assuming linear-MMSE detector employed at the receiver, reads $$SINR_i = \frac{1}{[W_{PMI}^H H^H R_n^{-1} H W_{PMI} + I_{N_L}]_{i,i}} - 1, \quad (3)$$

where $[A]_{i,i}$ corresponds to an $i^{th}$ diagonal element of a matrix A.

In order to estimate a suitable PMI/RI, a link-quality metric (LQM), e.g., mean mutual information, denoted as mMI (per sub-band/wide-band) is computed, as given below, $$mMI(PMI, RI) = \left(\frac{1}{K \cdot \text{rank}}\right) \sum_{k=1}^{K} \sum_{i=1}^{RI=rank} I(SINR_i[k]) \quad (4)$$

where, $I(SINR_i[k])$ is a mutual information that is a function of post-processing $SINR_i[k]$ (and modulation alphabet A) as given in Table 6 for $i^{th}$ spatial layer and $k^{th}$ resource-element. The number of resource-elements employed for the computation of the aforementioned LQM is given by a parameter K (depending on the wide-band/sub-band PMI estimate).

TABLE 2

Mutual information for 4-QAM, 16-QAM and 64-QAM.

| Modulation Alphabet A | Mutual Information per symbol |
|---|---|
| 4-QAM | $I(SINR_i) = J(\sqrt{4SINR_i})$ |
| 16-QAM | $I(SINR_i) \approx (½) J(0.8818\sqrt{SINRi}) + (⅓) J(1.6764\sqrt{SINR_i}) + (¼) J(0.9316\sqrt{SINRi})$ |
| 64-QAM | $I(SINR_i) \approx (⅓) J(1.1233\sqrt{SINR_i}) + (⅓) J(0.4381\sqrt{SINRi}) + (¼) J(0.4765\sqrt{SINRi})$ |

$$J(a) \approx \begin{cases} -0.04210610\, a^3 + 0.209252\, a^2 - 0.00640081\, a, & 0 < a < 1.6363 \\ 1 - \exp(0.00181491\, a^3 - 0.142675 a^2 - 0.08220540\, a + 0.0549608), & 1.6363 < a < \infty \end{cases}$$

After having the estimate of mMI (per sub-band/wide-band), the PMI and RI can be jointly estimated, employing unconstrained optimization, which can be given as $$\max_{PMI, Ri} mMI(PMI, RI).$$

Note that conventionally, an exhaustive search of the PMI and RI are computed based on the mutual information approach. Note that the CQI is computed afterwards with the chosen PMI/RI.

Instead of finding mutual information, in an alternative approach, the capacity is calculated as shown below in equation (4):

$$\text{capacity}(PMI, RI) = \left(\frac{1}{K \cdot \text{rank}}\right) \sum_{k=1}^{K} \sum_{i=1}^{RI=rank} \log_2(1 + SINR_i[k]) \quad (4)$$

Figure 5:
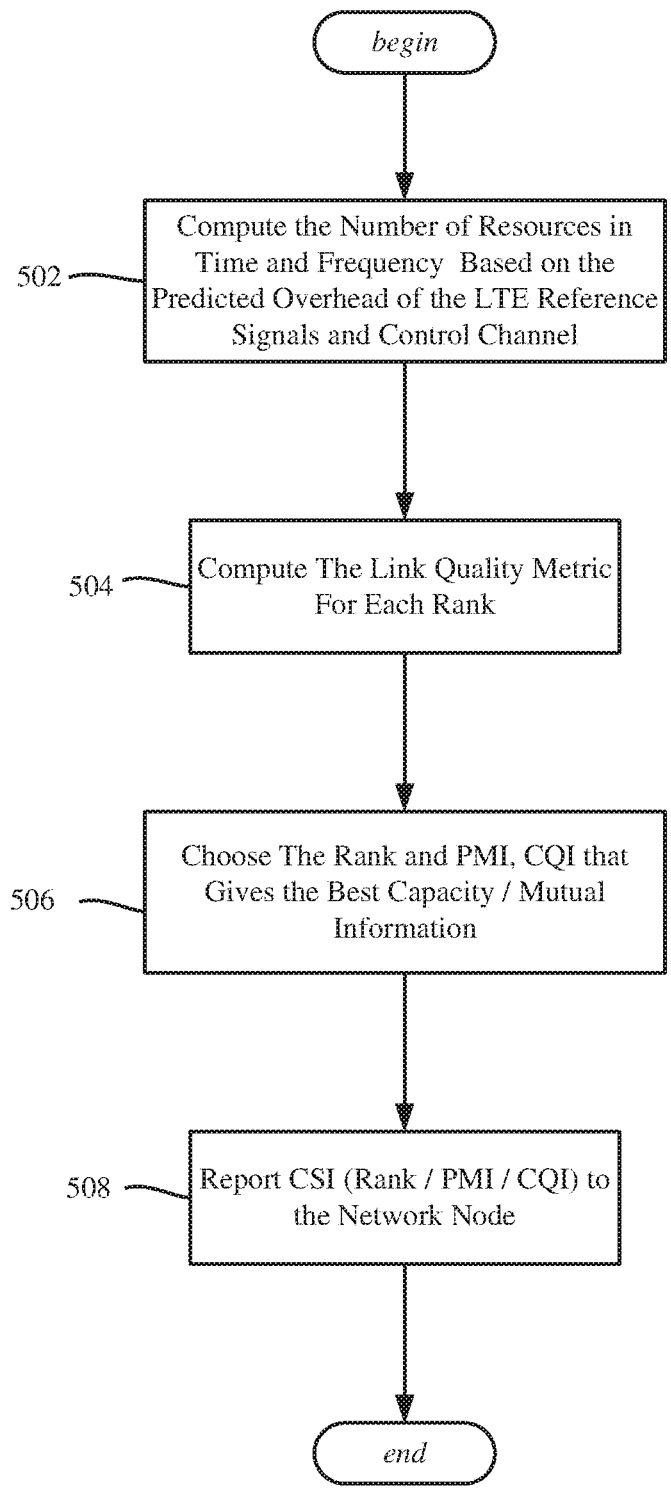
FIG. 5 is a flow diagram representing example operations that a user equipment can perform in computing channel state information for reporting to a network device, in accordance with various aspects and implementations of the subject disclosure

FIG. 5 summarizes example operations of a user equipment to report the CSI when LTE is detected, that is, LTE-NR coexistence is in use. Operation 502 computes the number of resources in time and frequency based on the predicted overhead of the LTE reference signals and control channel. Operation 504 computes a link quality metric for each rank, as described herein. Operation 506 chooses the rank and Precoding Matrix Indicator, CQI that gives the best capacity/mutual information. Operation 508 reports the CSI to the network node.

Figure 6:
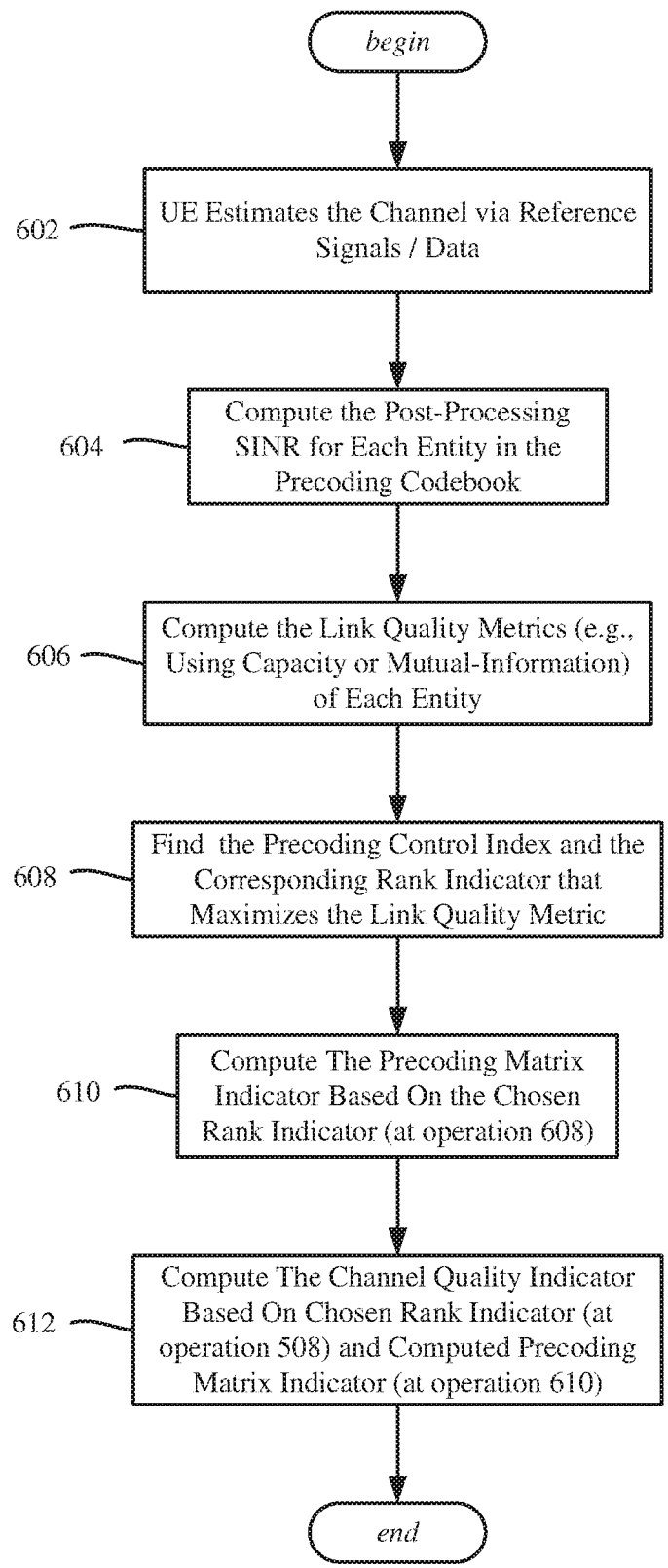
FIG. 6 is a flow diagram representing example operations that a user equipment can perform in computing channel state information using mutual information or a capacity approach, in accordance with various aspects and implementations of the subject disclosure

FIG. 6 summarizes a process for finding the rank indicator/precoding matrix indicator, and thereby computing the channel quality indicator, which applies to the mutual information and capacity based approaches. Operation 602 represents the user equipment estimating the channel via reference signals/data. Operation 604 computes the post-processing SINR for each entity in the precoding codebook.

Operation 606 computes the link quality metrics for either capacity or mutual-information of each entity, as described above. Operation 608 finds the precoding control index and the corresponding rank indicator that maximizes the link quality metric. Operation 610 computes the precoding matrix indicator based on the rank indicator chosen at operation 608. Operation 612 computes the channel quality indicator based on the precoding matrix indicator and the rank indicator.

Figure 7:
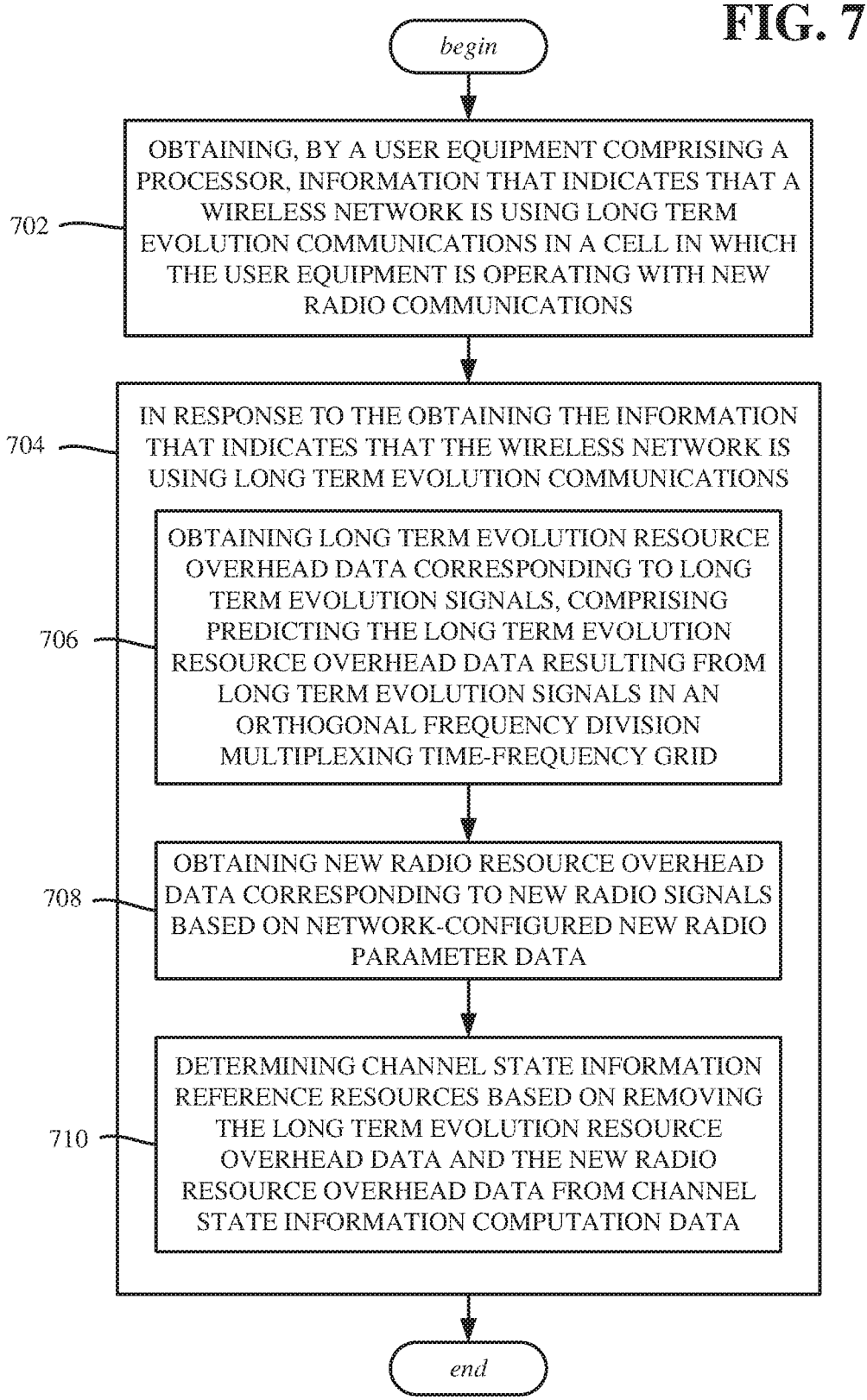
FIG. 7 is a flow diagram representing example operations of a user equipment when the user equipment determines that long term evolution (LTE) communications are occurring in a cell in which the user equipment is operating with new radio communications and channel state information reporting is performed, in accordance with various aspects and implementations of the subject disclosure

One or more aspects, such as those implemented in example operations of a method, are shown in FIG. 7 in accordance with various aspects and embodiments of the subject disclosure. Operation 702 represents obtaining, by a user equipment comprising a processor, information that indicates that a wireless network is using long term evolution communications in a cell in which the user equipment is operating with new radio communications;

Operation 704 represents, in response to the obtaining the information that indicates that the wireless network is using long term evolution communications, obtaining (operation 706) long term evolution resource overhead data corresponding to long term evolution signals, comprising predicting the long term evolution resource overhead data resulting from long term evolution signals in an orthogonal frequency division multiplexing time-frequency grid, obtaining (operation 708) new radio resource overhead data corresponding to new radio signals based on network-configured new radio parameter data, and determining (operation 710) channel state information reference resources based on removing the long term evolution resource overhead data and the new radio resource overhead data from channel state information computation data.

Obtaining the information that indicates that the wireless network is using long term evolution communications can comprise communicating with a network device. Obtaining the information that indicates that the wireless network is using long term evolution communications can comprise detecting that a network device has configured the user equipment with rate matching patterns for avoidance of interference between long term evolution traffic and new radio traffic.

Obtaining the information that indicates that the wireless network is using long term evolution communications can comprise processing a broadcast channel message that indicates that long term evolution transmissions are likely present on a carrier according to a likelihood criterion. Obtaining the information that indicates that the wireless network is using long term evolution communications can comprise determining a physical downlink control channel starting symbol location. Obtaining the information that indicates that the wireless network is using long term evolution communications can comprise determining a demodulation reference signal starting symbol location.

Obtaining the information that indicates that the wireless network is using long term evolution communications can comprise detecting physical control format indicator channel signals corresponding to long term evolution signals at a long term evolution component of the user equipment, and based on the detecting the physical control format indicator channel signals, communicating information from the long term evolution component to a new radio component of the user equipment that indicates that long term evolution is in use.

Obtaining the information that indicates that the wireless network is using long term evolution communications can comprise detecting reference signals corresponding to long term evolution signals at a long term evolution component of the user equipment, and based on the detecting the reference signals, communicating information from the long term evolution component to a new radio component of the user equipment that indicates that long term evolution is in use.

Obtaining the information that indicates that the wireless network is using long term evolution communications can comprise determining that a frequency band in which the user equipment is operating is a frequency band defined to support long term evolution-new radio coexistence. Obtaining the information that indicates that the wireless network is using long term evolution communications can comprise analyzing a detected subcarrier spacing in a synchronization signal block and a time-domain mapping pattern.

Determining the channel state information reference resources can comprise using mutual information to compute a link-quality metric, using the link-quality metric to obtain a precoding matrix indicator and a rank indicator, and estimating a channel quality indicator based on the precoding matrix indicator and the rank indicator. Determining the channel state information reference resources can comprise using a capacity computation to compute a link-quality metric, using the link-quality metric to obtain a precoding matrix indicator and a rank indicator, and estimating a channel quality indicator based on the precoding matrix indicator and the rank indicator.

Figure 8:
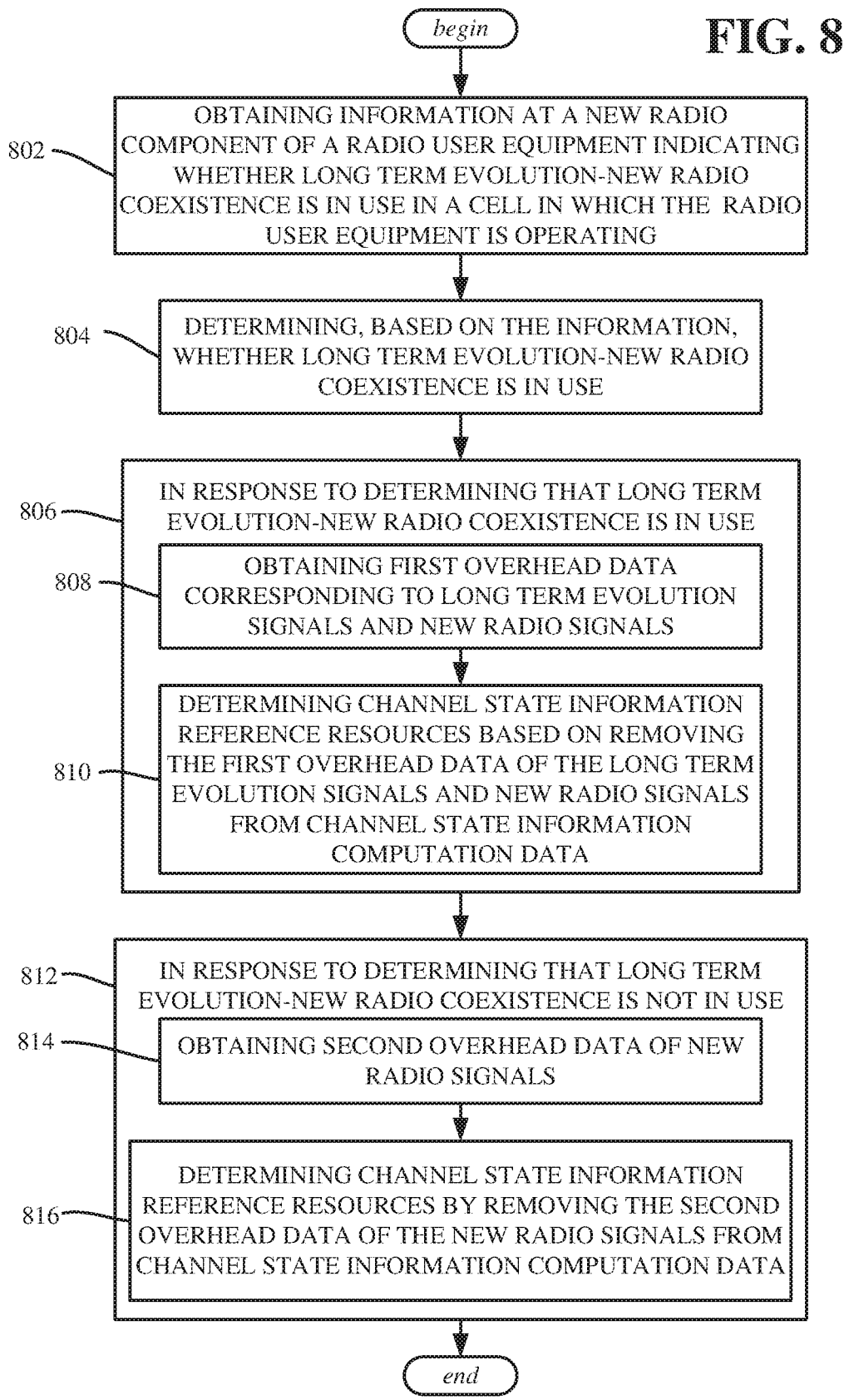
FIG. 8 is a flow diagram representing example operations of a user equipment to determine whether NR-LTE coexistence is active in a cell in which the user equipment is operating and channel state information reporting is performed, in accordance with various aspects and implementations of the subject disclosure

One or more example aspects are represented in FIG. 8, and can correspond to a user equipment device comprising a processor and a memory that stores executable instructions that, when executed by the processor, facilitate performance of operations and/or components. Example operations comprise operation 802, which represents obtaining information at a new radio component indicating whether long term evolution-new radio coexistence is in use in a cell in which the radio user equipment is operating. Operation 804 represents determining, based on the information, whether long term evolution-new radio coexistence is in use. Operation 806 represents, in response to determining that long term evolution-new radio coexistence is in use, obtaining (operation 808) first overhead data corresponding to long term evolution signals and new radio signals, and determining (operation 810) channel state information reference resources based on removing the first overhead data of the long term evolution signals and new radio signals from channel state information computation data. Operation 812 represents, in response to determining that long term evolution-new radio coexistence is not in use, obtaining (operation 814) second overhead data of new radio signals, and determining (operation 816) channel state information reference resources by removing the second overhead data of the new radio signals from channel state information computation data.

Obtaining the information that indicates whether long term evolution-new radio coexistence is in use can comprise at least one of: communicating with a network device, processing a broadcast channel message that indicates whether long term evolution transmissions are present on a carrier, determining a physical downlink control channel starting symbol location, or determining a demodulation reference signal starting symbol location.

Obtaining the information that indicates whether long term evolution-new radio coexistence is in use can comprise detecting that a network device has configured the user equipment with a rate matching pattern to avoid interference between long term evolution traffic and new radio traffic.

Obtaining the information that indicates whether long term evolution-new radio coexistence is in use can comprise deriving long term evolution overhead data based on configured long term evolution parameters.

Obtaining the information that indicates whether long term evolution-new radio coexistence is in use can comprise at least one of: determining that a frequency band in which the user equipment is operating is a frequency band defined to support long term evolution-new radio coexistence, or analyzing a detected subcarrier spacing in a synchronization signal block and a time-domain mapping pattern.

Figure 9:
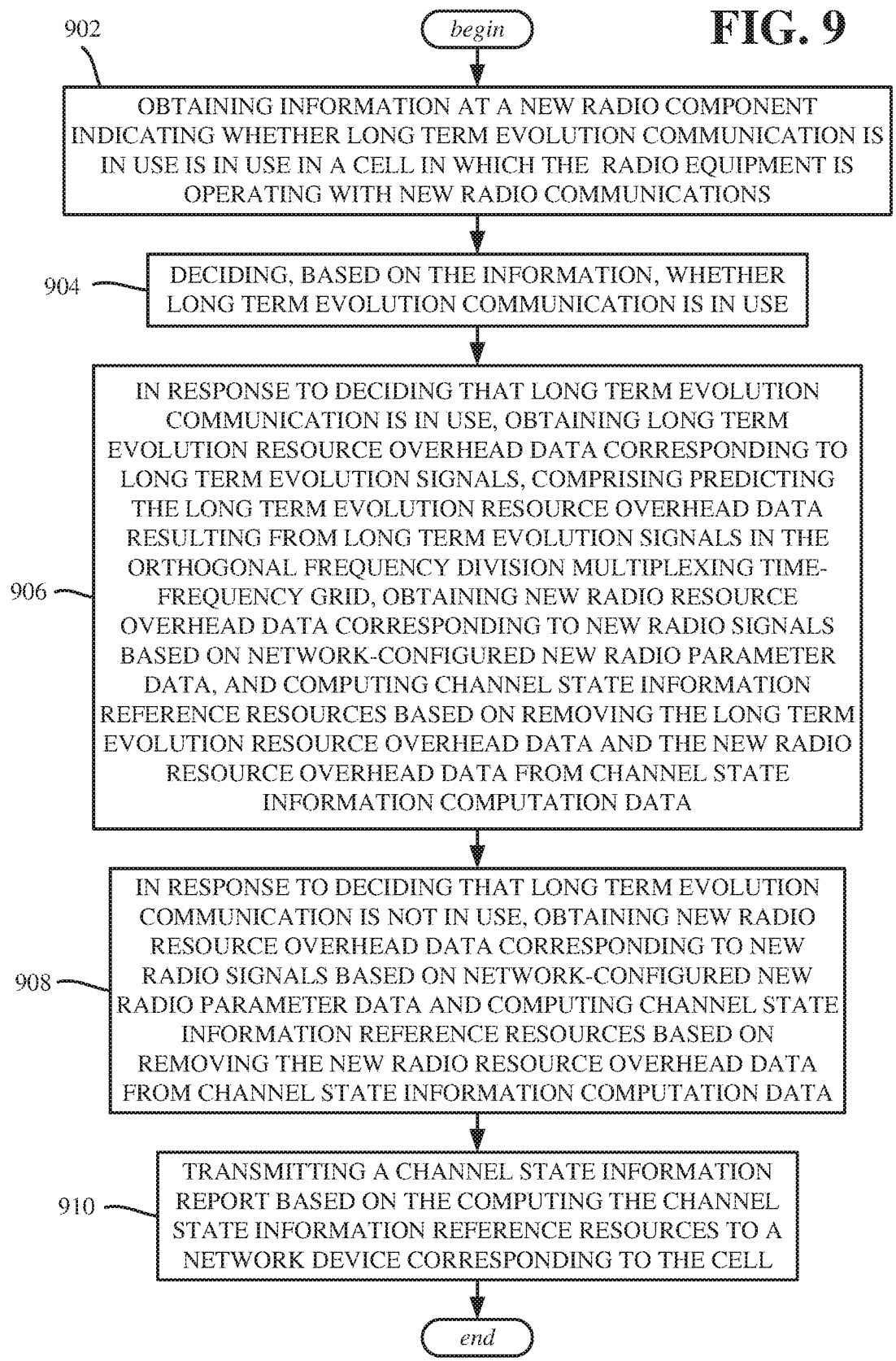
FIG. 9 is a flow diagram representing example operations of a user equipment to report channel state information based on whether the user equipment determines that long term evolution (LTE) communication is occurring in a cell in which the user equipment is operating with new radio communications, in accordance with various aspects and implementations of the subject disclosure

One or more aspects, such as implemented in a machine-readable storage medium, comprising executable instructions that, when executed by a processor, facilitate performance of operations, are represented in FIG. 9. Example operations comprise operation 902, which represents obtaining information at a new radio component indicating whether long term evolution communication is in use in a cell in which the radio user equipment is operating with new radio communications. Operation 904 represents deciding, based on the information, whether long term evolution communication is in use. Operation 906 represents, in response to deciding that long term evolution communication is in use, obtaining long term evolution resource overhead data corresponding to long term evolution signals, comprising predicting the long term evolution resource overhead data resulting from long term evolution signals in the orthogonal frequency division multiplexing time-frequency grid, obtaining new radio resource overhead data corresponding to new radio signals based on network-configured new radio parameter data, and computing channel state information reference resources based on removing the long term evolution resource overhead data and the new radio resource overhead data from channel state information computation data. Operation 908 represents, in response to deciding that long term evolution communication is not in use, obtaining new radio resource overhead data corresponding to new radio signals based on network-configured new radio parameter data and computing channel state information reference resources based on removing the new radio resource overhead data from channel state information computation data. Operation 910 represents transmitting a channel state information report based on the computing the channel state information reference resources to a network device corresponding to the cell.

Obtaining the information that indicates whether long term evolution communication is in use can comprise detecting that a network device has configured the user equipment with a rate matching pattern for avoiding interference between long term evolution traffic and new radio traffic. Obtaining the information that indicates whether long term evolution communication is in use can comprise deriving long term evolution overhead data based on configured long term evolution parameters.

As can be seen, with the technology described herein for computing the channel state information based on LTE-NR coexistence (or not), a user equipment computes more accurate channel state parameters for reporting to the network. This results in more accurate link estimation, for better link adaptation, which in turn increases the link and system throughput of the 5G system providing significant gains over the other techniques.

Figure 10:
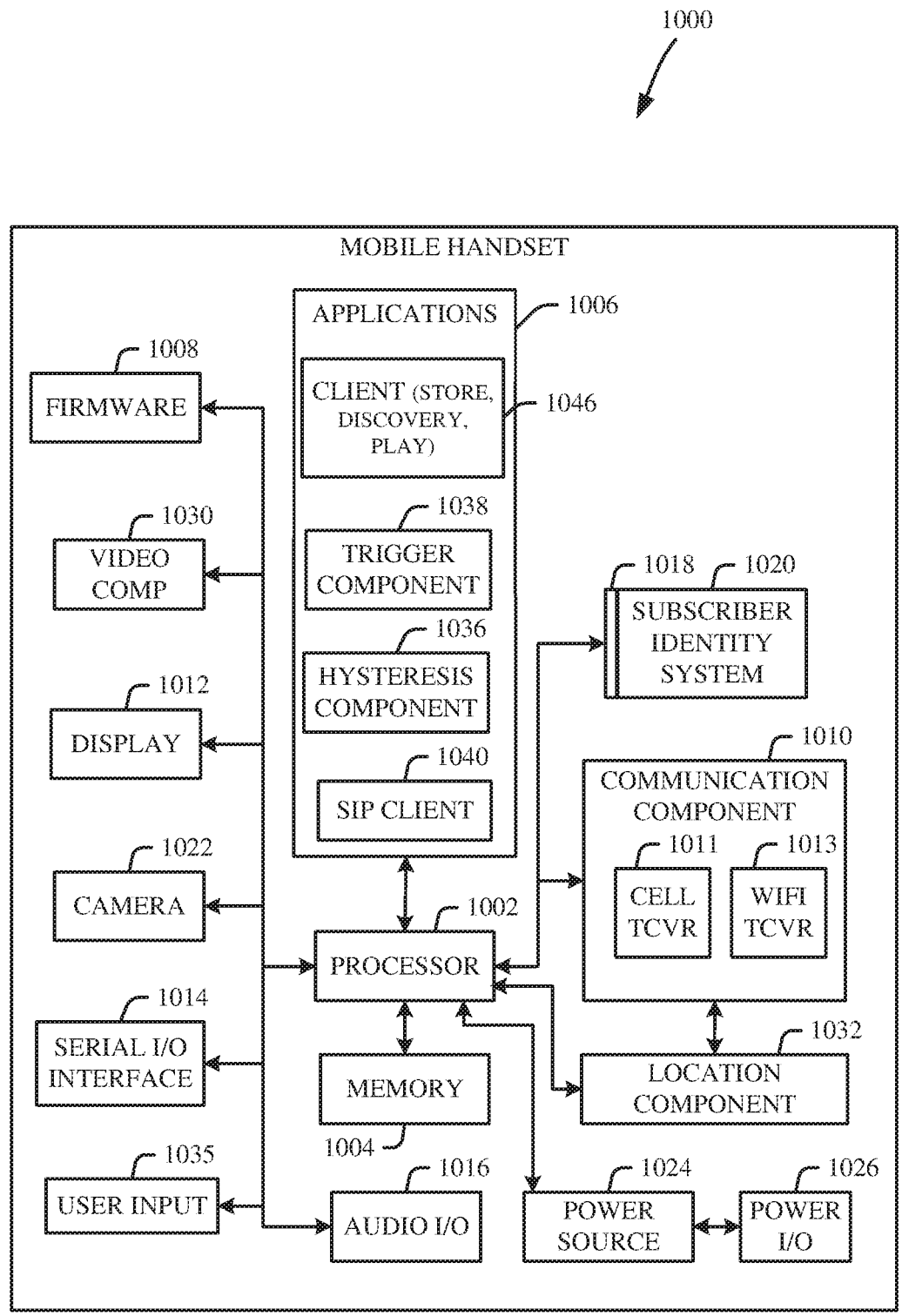
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
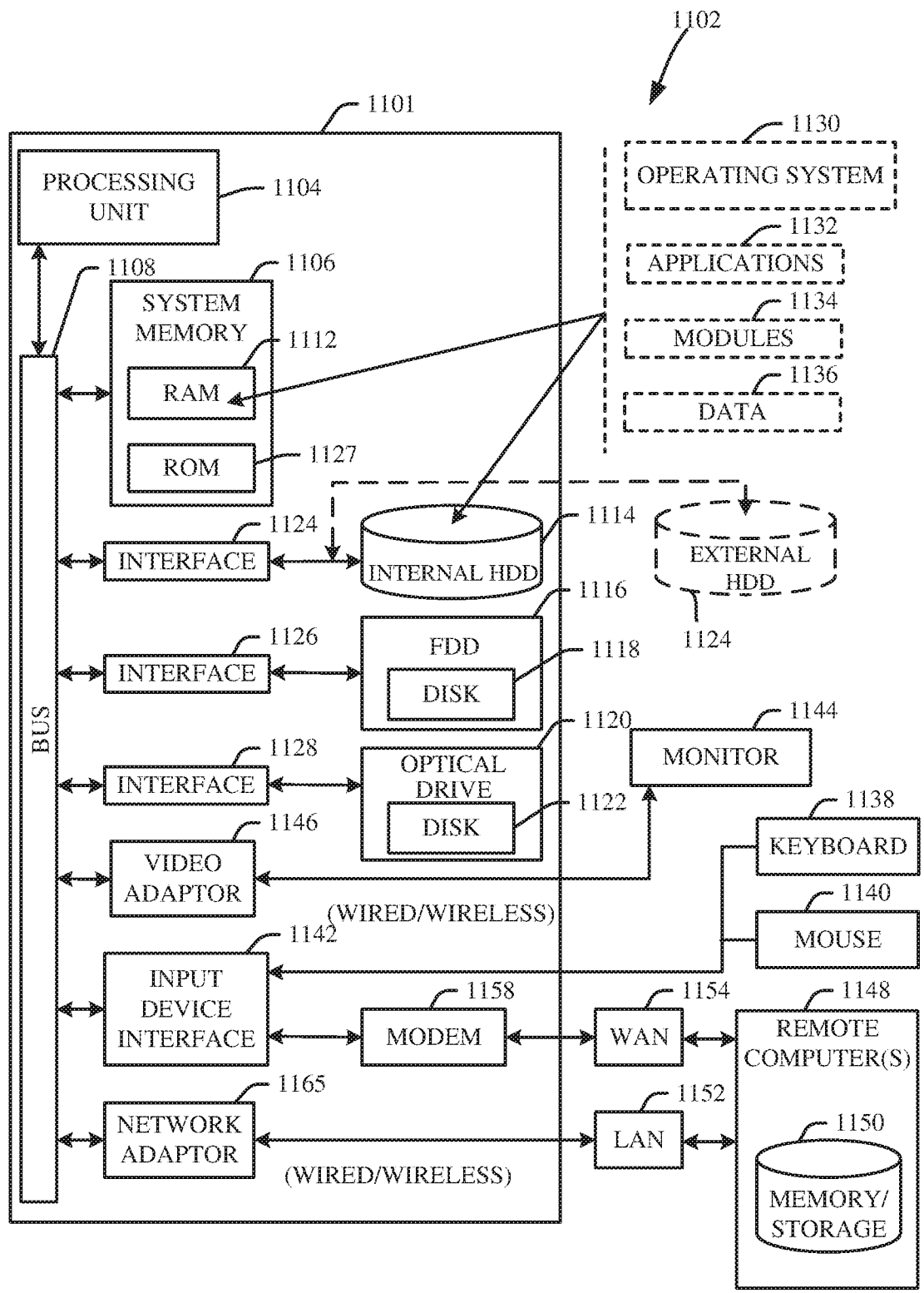
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

In order to provide a context for the various aspects of the disclosed subject matter, FIG. 11 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 1120, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, a mobile device and/or portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 and a move use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
   a processor; and
   a memory that stores executable instructions that, when executed by the processor, facilitate performance of operations, the operations comprising:
      determining that new radio communications and long term evolution communications are in use in a cell in which the network equipment operates based on a starting symbol location for non-user equipment specific control signaling received from the cell relative to a frame boundary;
      in response to determining that the new radio communications and the long term evolution communications are in use, predicting long term evolution resource overhead data associated with the long term evolution communications; and
      determining channel state information reference resources, wherein determining the channel state information reference resources comprises removing the long term evolution resource overhead data from channel state information computation data.

2. The network equipment of claim 1, wherein the operations further comprise:
   in further response to the determining that the new radio communications and the long term evolution communications are in use, obtaining new radio resource overhead data associated with the new radio communications, wherein determining the channel state information reference resources further comprises removing the new radio resource overhead data from the channel state information computation data.

3. The network equipment of claim 2, wherein obtaining the new radio resource overhead data comprises obtaining the new radio resource overhead data based on network-configured new radio parameter data.

4. The network equipment of claim 1, wherein the predicting comprises predicting the long term evolution resource overhead data resulting from the long term evolution communications in an orthogonal frequency division multiplexing time-frequency grid.

5. The network equipment of claim 1, wherein determining the channel state information reference resources comprises:
determining a link quality metric;
obtaining a precoding matrix indicator and a rank indicator based on the link quality metric; and
estimating a channel quality indicator based on the precoding matrix indicator and the rank indicator.

6. The network equipment of claim 5, wherein determining the channel state information reference resources further comprises:
determining a group of link quality metrics for respective entities in a precoding codebook associated with the cell;
selecting a precoding control index corresponding to an entity of the respective entities associated with a maximum link quality metric of the group of link quality metrics, resulting in a selected precoding control index;
selecting a first rank indicator associated with the selected precoding control index as the rank indicator; and
determining the precoding matrix indicator based on the rank indicator.

7. The network equipment of claim 5, wherein estimating the channel quality indicator comprises:
estimating a first channel quality indicator that maximizes a channel throughput based on the precoding matrix indicator, the rank indicator, and a block error rate threshold; and
selecting the channel quality indicator as the first channel quality indicator.

8. The network equipment of claim 1, wherein the network equipment is first network equipment, and wherein the operations further comprise:
preparing a channel state information report based on the channel state information reference resources; and
transmitting the channel state information report to second network equipment that is distinct from the first network equipment.

9. The network equipment of claim 8, wherein the second network equipment comprises a network device associated with the cell.

10. A method, comprising:
determining, by network equipment comprising a processor, that a cell in which the network equipment operates is configured for coexistence between new radio signals and long term evolution signals based on a starting symbol location for non-user equipment specific control signaling received from the cell relative to a frame boundary;
predicting, by the network equipment in response to the determining that the cell is configured for the coexistence, long term evolution resource overhead data associated with the long term evolution signals; and
determining, by the network equipment, channel state information reference resources at least in part by removing the long term evolution resource overhead data from channel state information computation data.

11. The method of claim 10, further comprising:
obtaining, by the network equipment in further response to the determining that the cell is configured for the coexistence, new radio resource overhead data associated with the new radio signals, wherein determining the channel state information reference resources comprises removing the new radio resource overhead data from the channel state information computation data.

12. The method of claim 10, wherein determining the channel state information reference resources comprises:
determining a link quality metric;
obtaining a precoding matrix indicator and a rank indicator based on the link quality metric; and
estimating a channel quality indicator based on the precoding matrix indicator and the rank indicator.

13. The method of claim 12, wherein determining the channel state information reference resources further comprises:
determining a group of link quality metrics for respective entities in a precoding codebook associated with the cell;
selecting a precoding control index corresponding to an entity of the respective entities associated with a maximum link quality metric of the group of link quality metrics, resulting in a selected precoding control index;
selecting a first rank indicator associated with the selected precoding control index as the rank indicator; and
determining the precoding matrix indicator based on the rank indicator.

14. The method of claim 12, wherein estimating the channel quality indicator comprises:
estimating a first channel quality indicator that maximizes a channel throughput based on the precoding matrix indicator, the rank indicator, and a block error rate threshold; and
setting the channel quality indicator to the first channel quality indicator.

15. The method of claim 10, wherein the network equipment is first network equipment, and wherein the method further comprises:
preparing, by the first network equipment, a channel state information report based on the channel state information reference resources; and
transmitting, by the first network equipment, the channel state information report to second network equipment that is distinct from the first network equipment.

16. A non-transitory machine-readable medium comprising executable instructions that, when executed by a processor of a network device, facilitate performance of operations, comprising:
determining that a cell in which the network device operates is configured for new radio communications and long term evolution communications based on a starting symbol location for non-user equipment specific control signaling received from the cell relative to a frame boundary;
predicting long term evolution resource overhead data associated with the long term evolution communications; and
determining channel state information reference resources at least in part by removing the long term evolution resource overhead data from channel state information computation data.

17. The non-transitory machine-readable medium of claim 16, wherein the operations further comprise:
  obtaining new radio resource overhead data associated with the new radio communications; and
  determining the channel state information reference resources further by removing the new radio resource overhead data from the channel state information computation data.

18. The non-transitory machine-readable medium of claim 16, wherein the operations further comprise:
  determining a link quality metric;
  determining a precoding matrix indicator and a rank indicator based on the link quality metric; and
  estimating a channel quality indicator based on the precoding matrix indicator and the rank indicator.

19. The non-transitory machine-readable medium of claim 18, wherein the operations further comprise:
  determining link quality metrics for respective entities in a precoding codebook associated with the cell;
  designating a selected precoding control index corresponding to an entity of the respective entities associated with a maximum link quality metric of the link quality metrics;
  selecting a first rank indicator associated with the selected precoding control index as the rank indicator; and
  determining the precoding matrix indicator based on the rank indicator.

20. The non-transitory machine-readable medium of claim 18, wherein the operations further comprise:
  designating a first channel quality indicator from a group of channel quality indicators that maximizes a channel throughput based on the precoding matrix indicator, the rank indicator, and a block error rate threshold as the channel quality indicator.

* * * * *